Sept. 2, 1947.  R. G. LE TOURNEAU  2,426,889
SELF-LOADING WAGON
Filed April 9, 1946  2 Sheets-Sheet 1

INVENTOR
R. G. LeTourneau
BY
ATTORNEYS

Patented Sept. 2, 1947

2,426,889

UNITED STATES PATENT OFFICE 2,426,889

SELF-LOADING WAGON

Robert G. Le Tourneau, Peoria, Ill., assignor to R. G. Le Tourneau, Inc., Stockton, Calif., a corporation of California Application April 9, 1946, Serial No. 660,658

3 Claims. (Cl. 214—77)

This invention is directed to, and it is an object to provide, an improved load carrying wagon; such wagon being of low bed type. While especially designed for use in hauling pulp-wood timber from the forest where cut, the wagon is adaptable to many other uses.

An additional object of the present invention is to provide a load carrying wagon which is self-loading; i. e. includes power actuated means arranged to lift a load from the ground and deposit such load on the bed of the wagon. Such power actuated means comprises a novel boom assembly swingably mounted on the wagon, and cable controlled from an electric winch unit on said wagon; there being a lift cable depending from the head of the boom for load engagement, and being controlled by another electric winch unit mounted on said boom.

A further object of the invention is to provide a load carrying wagon, as in the preceding paragraph, wherein the boom assembly includes an upstanding arch boom disposed in straddling relation to the bed of the wagon and pivotally connected thereto for swinging motion lengthwise of said bed between a rearwardly and upwardly inclined position extending beyond the rear end of the wagon, and a forwardly and upwardly inclined position extending above the front end of said wagon; there being a winch actuated cable system operative to swing the boom between said positions.

A further object of the invention is to produce a self-loading wagon which is practical, and effective for the purposes for which it is designed.

These objects are accomplished by means of such structure and relative arrangement of parts as will fully appear by a perusal of the following specification and claims.

Figure 1:
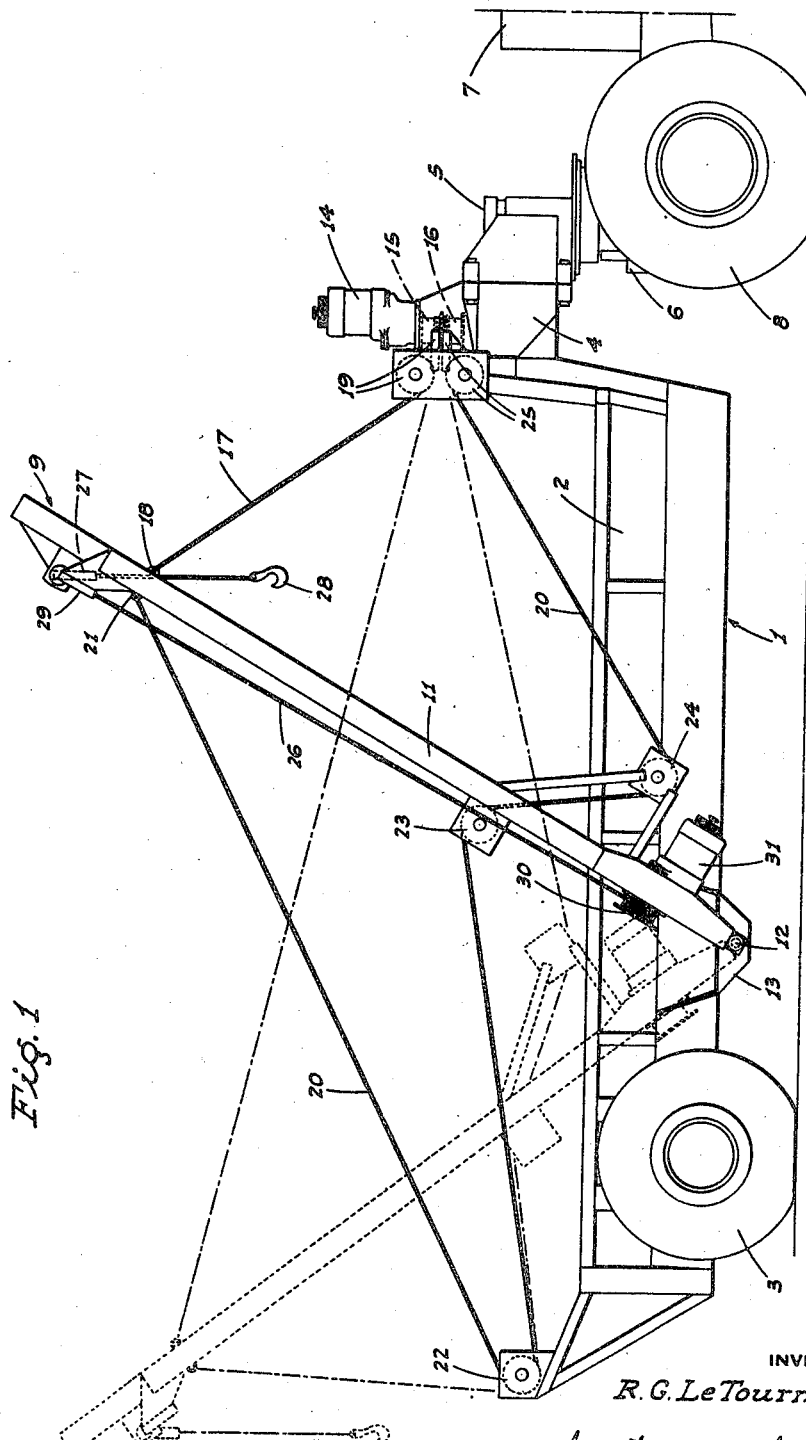
Fig. 1 is a side elevation of the self-loading wagon.
Figure 2:
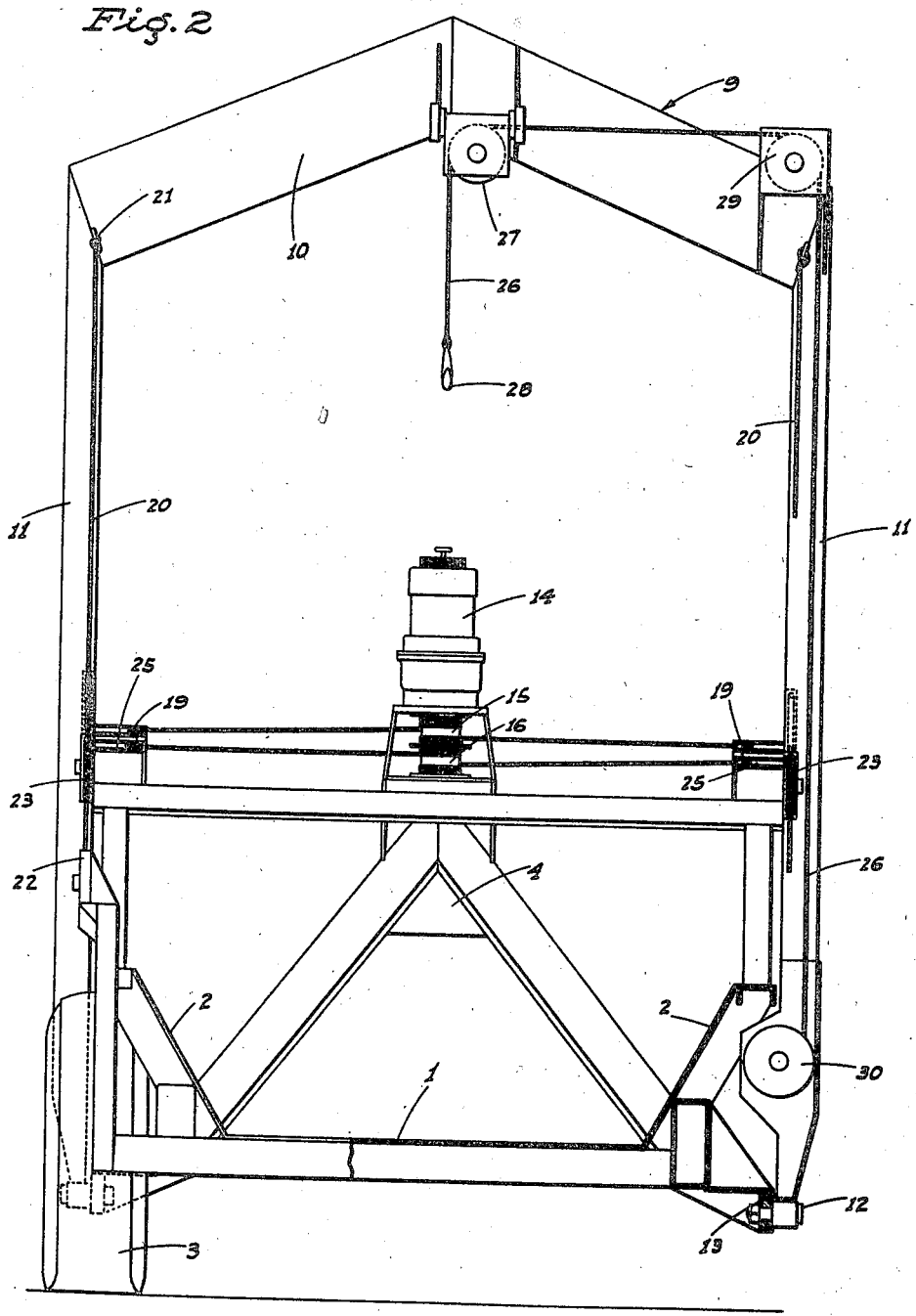
Fig. 2 is a rear end view of the wagon, with one wheel removed, and partly in section.

Referring now more particularly to the characters of reference on the drawings, the wagon comprises a low bed 1 of elongated construction, open at its rear end, closed at its forward end, and having upwardly and outwardly flaring sides 2.

Adjacent its rear end the bed 1 is supported by transversely spaced, pneumatic-tired wheels 3. At its forward end the bed 1 is provided, centrally of the sides 2 and some distance thereabove, with a rigid, forwardly projecting neck 4 coupled in draft relation to a power steering unit 5 mounted on and upstanding from the rear deck 6 of a two-wheel tractor 7 which includes transversely spaced, pneumatic-tired drive wheels 8.

Intermediate its ends the low bed 1 is straddled by an upstanding arch boom, indicated generally at 9, which arch boom includes a cross head 10 fixed, at opposite ends, in rigid connection with the top of relatively tall legs 11.

The lower end portions of the boom legs 11 depend to the outside and in intersecting relation to the flaring sides 2 of the bed 1, and at their lower ends said legs are pivotally connected, as at 12, to attachment brackets 13 formed in connection with and projecting downwardly from said bed.

The arch boom 9 is thus pivotally mounted for swinging movement between a rearwardly and upwardly inclined position extending beyond the rear end of the bed, as shown in dotted lines in Fig. 1, and a forwardly and upwardly inclined position extending above the front end of said bed, as shown in full lines in said figure.

The arch boom 9 is swung between said positions by the following power actuated means:

An electric winch unit 14 is mounted on the neck 4 and includes a pair of vertical-axis cable drums, the upper drum being shown at 15, while the lower drum is shown at 16.

A transversely spaced pair of forward pull cables 17 are anchored, as at 18, to the boom legs 11 adjacent their upper ends, and thence extend forwardly and downwardly about direction changing sheaves 19 on the wagon at the front corners thereof and in substantially the horizontal plane of the drum 15. From the direction changing sheaves 19 the forward pull cables 17 extend laterally toward, and are oppositely wound about, the upper drum 15 of the electric winch unit 14.

A transversely spaced pair of rearward pull cables 20 are anchored at one end, as at 21, to the upper end portions of corresponding legs 11 of the boom 9 and thence extend downwardly and rearwardly about direction changing sheaves 22 mounted on brackets on the rear of the bed 1 at opposite sides thereof. From the sheaves 22 the cables 20 run forward and pass over and under a vertically spaced pair of sheaves 23 and 24, respectively, secured on the corresponding boom leg 11 in offset relation lengthwise of the wagon, as shown. The reason for the sheaves 23 and 24 will be described hereinafter. From the sheaves 24 the cables 20 extend forwardly and about direction-changing sheaves 25 which are mounted on the front of the wagon directly below the sheaves 19 and in substantially the horizontal plane of the lower drum 16 of the electric winch unit 14. From the direction-changing sheaves 25 the cables 20 extend to and are oppositely wound about said lower drum 16.

The rearward pull cables 20, in addition to being wound on the drum 16 oppositely relative to each other, are also wound on said drum opposite to the corresponding ones of the forward pull cables 17. By reason of this cable arrangement, and by virtue of the fact that the electric winch unit 14 is reversible, said unit can be actuated to cause the forward pull cables 17 to run toward the winch, while the rearward pull cables 20 pay out; or to cause the rearward pull cables 20 to run toward the winch with the forward pull cables 17 paying out. The winch unit 14 is thus operative to cause forward or rearward swinging motion of the arch boom 9 between the limits of its movement.

The vertically spaced sheaves 23 and 24, offset as shown, serve to maintain the rearward pull cables 20 substantially taut in all positions of the boom, as otherwise said cables would tend to tighten and loosen as the boom traversed its arc. In other words, the sheaves 23 and 24 serve as compensating means to prevent such undesirable tightening and loosening of the cables 20 with swinging of the boom.

A lift cable 26 depends from a swinging or fairlead sheave 27 secured to the cross head 10 centrally of its ends, and at its lower end said lift cable is fitted with a hook 28. From the swinging sheave 27 the cable extends laterally about a direction-changing sheave 29 on one end of the crosshead 10 and thence depends downwardly along the adjacent boom leg 11 to connection, in wound relation, with the cable drum 30 of an electric winch unit 31 mounted on said boom leg adjacent but short of its pivot 12, whereby said winch unit, together with the drum 30, moves with the boom in all positions of adjustment thereof.

The electric winch unit 31 is reversible, whereby hook 28 of lift cable 26 may be raised or lowered relative to the crosshead 10.

The electric winch units 14 and 31 each include a normally set or holding brake which is arranged to automatically release whenever the winch unit is energized or actuated. The electric winch units 14 and 31 are selectively and reversibly controlled by the tractor operator through the medium of a control circuit (not shown), and which circuit derives its current from a heavy-duty generator mounted on the tractor 7.

In use of the above described self-loading wagon the boom 9 is first swung to load pick-up position, which is the upwardly and rearwardly inclined position shown in dotted lines in Fig. 1. Thereafter the electric winch unit 31 is actuated in a direction to lower the hook 28 for engagement with the load. The next step is to reversely operate the winch unit 31 until the load, or at least one end thereof, is lifted in clearance relation to the low bed 1. The electric winch unit 14 is then actuated in a direction to swing the boom forwardly, which pulls the load onto said bed 1, whereupon the lift cable 26 is lowered to permit release of the hook 28 from said load.

As previously indicated, the described self-loading wagon is designed for use in loading pulpwood timbers, and for transporting said timbers when loaded onto the wagon, from the forest where cut. Obviously, however, the wagon is useful for many other purposes; the power actuated boom assembly providing an efficient and practical arrangement for the loading of relatively heavy or cumbersome objects onto the bed of the wagon without the use of a separate crane.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as set forth herein.

Having thus described the invention, the following is claimed as new and useful, and upon which Letters Patent are desired:

1. A self-loading wagon comprising a wheel supported bed adapted for movement along the ground, a boom assembly mounted in connection with the bed for swinging motion in a longitudinal vertical plane, power means arranged to swing the boom, a lift cable depending from the top of the boom, and power means arranged to actuate the lift cable; said first named power means comprising a winch unit mounted on the wagon adjacent the forward end of the bed, said winch including a cable drum unit, a pair of cables reversely wound on the drum unit and extending therefrom, sheaves cooperating with the cables and arranged on the wagon whereby one cable is reeved as a forward pull cable relative to the boom and the other cable is reeved as a rearward pull cable relative to the boom, and means connected said cables to the boom.

2. A wagon as in claim 1 in which the rearward pull cable includes a rearwardly extending reach leading from the winch unit, and a forwardly extending reach connected to the boom, there being a direction-changing sheave between said reaches, and a pair of vertically spaced sheaves on the boom; said rearwardly extending reach running under one of said pair of sheaves and thence to and over the other.

3. A self-loading wagon comprising a wheel supported bed adapted for movement along the ground, an arch boom assembly upstanding from and straddling the bed intermediate its ends, means pivoting the boom assembly adjacent its lower ends in connection with the bed for swinging motion in a longitudinal vertical plane, a reversible winch unit mounted on the wagon adjacent the forward end of the bed, a pair of cables leading from the winch, sheaves guiding said cables for connecting with the boom assembly as a forward pull cable and a rearward pull cable, and a lift cable depending from the top of the boom assembly.

ROBERT G. LE TOURNEAU.

REFERENCES CITED

The following references are of record in the file of this patent:

UNITED STATES PATENTS

| Number | Name | Date |
| --- | --- | --- |
| 965,493 | Williams | July 26, 1910 |
| 1,875,103 | Mosel | Aug. 30, 1932 |
| 2,047,604 | Weichardt | July 14, 1936 |
| 2,181,253 | Willis | Nov. 28, 1939 |
| 2,244,559 | Lawton | June 3, 1941 |
| 2,281,507 | LeTourneau | Apr. 28, 1942 |
| 2,292,870 | Dixon | Aug. 11, 1942 |

FOREIGN PATENTS

| Number | Country | Date |
| --- | --- | --- |
| 537,525 | France | Mar. 6, 1922 |
| 560,563 | France | July 12, 1923 |